US008214677B2

(12) United States Patent
Burton et al.

(10) Patent No.: US 8,214,677 B2
(45) Date of Patent: Jul. 3, 2012

(54) VOLTAGE REGULATOR WITH SUSPEND MODE

(75) Inventors: Edward Burton, Hillsboro, OR (US); Robert Greiner, Beaverton, OR (US); Anat Deval, Beaverton, OR (US); Doug Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 12/502,023

(22) Filed: Jul. 13, 2009

(65) Prior Publication Data

US 2009/0276642 A1 Nov. 5, 2009

Related U.S. Application Data

(63) Continuation of application No. 11/416,534, filed on May 3, 2006, now abandoned.

(51) Int. Cl.
*G06F 1/00* (2006.01)

(52) U.S. Cl. ........ 713/324; 713/300; 713/320; 323/212; 323/214

(58) Field of Classification Search .................. 713/300, 713/320, 324; 323/212, 214
See application file for complete search history.

(56) References Cited

U.S. PATENT DOCUMENTS

| | | | | |
|---|---|---|---|---|
| 6,674,274 | B2 * | 1/2004 | Hobrecht et al. | 323/285 |
| 6,721,893 | B1 * | 4/2004 | Tressler et al. | 713/300 |
| 7,027,944 | B2 | 4/2006 | Tabaian et al. | |
| 7,193,410 | B2 * | 3/2007 | Patel et al. | 324/762.09 |
| 7,253,594 | B2 * | 8/2007 | Paul et al. | 323/268 |
| 7,444,524 | B2 * | 10/2008 | Gunther et al. | 713/300 |
| 7,624,286 | B2 * | 11/2009 | Lin et al. | 713/300 |
| 7,624,291 | B2 * | 11/2009 | Nguyen | 713/320 |
| 2006/0161792 | A1 * | 7/2006 | Paul et al. | 713/300 |
| 2007/0075694 | A1 * | 4/2007 | Xi et al. | 323/282 |
| 2007/0234078 | A1 * | 10/2007 | Nguyen | 713/300 |

* cited by examiner

*Primary Examiner* — Thomas Lee
*Assistant Examiner* — Jaweed A Abbaszadeh
(74) *Attorney, Agent, or Firm* — Garrett IP, LLC

(57) ABSTRACT

A system is disclosed. The system includes a central processing unit (CPU) to operate in one or more low power sleep states, and a power converter. The power converter includes phase inductors; and one or more power switches to drive the phase inductors. The one or more power switches are deactivated during the CPU sleep state.

15 Claims, 4 Drawing Sheets

VR Microcontroller
410

FSM Control Block
420

VR
Type III Compensator
432
Pulse-Width Modulator
436
430

250

To Power Converter

VOLTAGE REGULATOR WITH SUSPEND MODE

RELATED APPLICATION

This application is a continuation of U.S. patent application Ser. No. 11/416,534 filed on May 3, 2006.

FIELD OF THE INVENTION

The present invention relates to computer systems; more particularly, the present invention relates to regulating voltage in a microprocessor.

BACKGROUND

Growing demand for integrated circuits (ICs), for example microprocessors, with ever higher levels of performance and functionality have driven these devices to circuit densities beyond 100 million transistors per die. This number may soon exceed one billion transistors on a single die. The growth in transistor density has been made possible by the use of MOSFET transistors with gate lengths below 100 nm. As gate length has shortened, power supply voltages have fallen, in some cases, to below 1 V.

Even in a mobile computing environment (laptop), high-speed microprocessors, with clock speeds in excess of 2 GHz, may require in excess of 100 watts of power when operating at maximum load. With operating voltages below 1 V, this translates to power supply currents that reach beyond 100 A. Nevertheless, when used in a mobile environment, the same microprocessor must often draw less than 1 watt of "average power" due to battery considerations.

Integrated circuits are typically powered from one or more DC supply voltages provided by external supplies and converters. The power is provided through pins, leads, lands, or bumps on the integrated circuit package. The traditional method for providing such high power to integrated circuits may involve the use of a high-efficiency, programmable DC-to-DC (switch-mode) power converter located near the IC package.

This type of converter (buck regulator) may use a DC input voltage as high as 48V and provide a DC output voltage below 2 V. Conventional DC-to-DC power converters use switching frequencies in the neighborhood of 200 KHz, with some high-end units in the 1-2 MHz range. Such converters usually require a handful of relatively large components, including a pulse-width modulation (PWM) controller, one or more power transistors, filter and decoupling capacitors, and one or more large inductors and/or transformers.

Typical switch-mode power converters include one or more phases to supply the full output current. However, in many instances it may be inefficient to implement full operation of the converter, especially in applications that have low (e.g., nearly 0) current draw.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A voltage regulator having a suspend mode is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
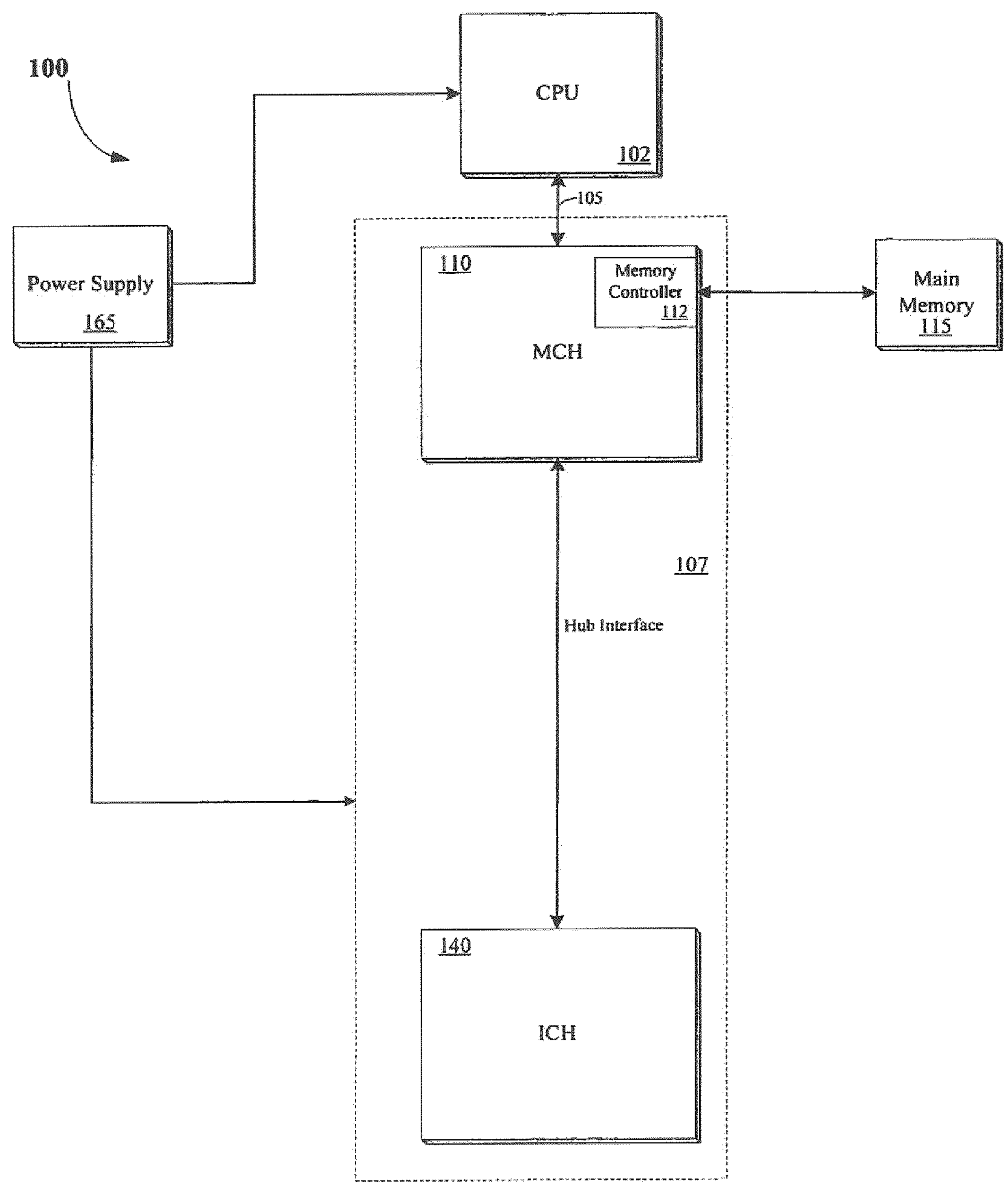
FIG. 1 is a block diagram of one embodiment of a computer system.

FIG. 1 is a block diagram of one embodiment of a computer system 100. Computer system 100 includes a central processing unit (CPU) 102 coupled to interconnect 105. In one embodiment, CPU 102 is a processor in the Itanium® family of processors including the Itanium® 2 processor available from Intel Corporation of Santa Clara, Calif. Alternatively, other CPUs may be used.

A chipset 107 may also be coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interconnect 105, such as multiple CPUs and/or multiple system memories.

MCH 110 is coupled to an input/output control hub (ICH) 140 via a hub interface. ICH 140 provides an interface to input/output (I/O) devices within computer system 100. In addition, computer system 100 includes a power supply 165 to provide power to CPU 102 and chipset 107. In one embodiment, power supply 165 is implemented as multiple cascaded supplies, where a first supply converts the AC input from a wall outlet to a set of standard voltage rails, and a set of downstream supplies (often referred to as a point-of-load regulators) convert the standard voltages to the less standardized voltages directly used by advanced logic ICs.

Figure 2:
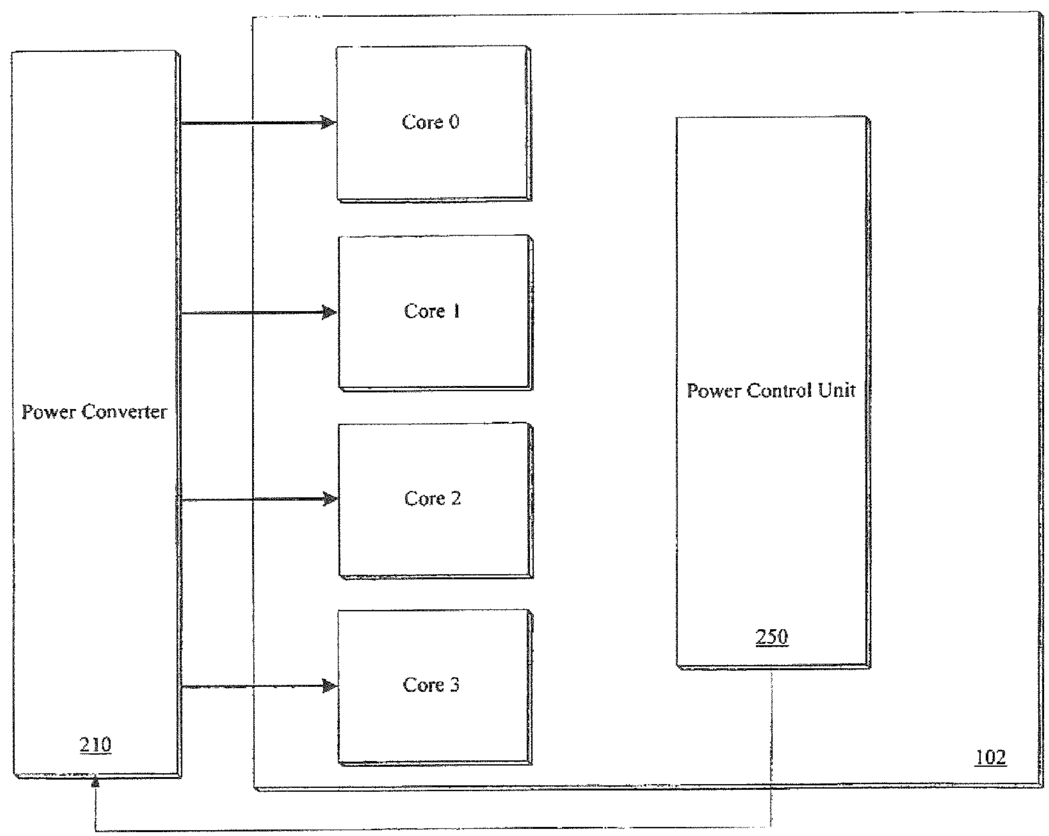
FIG. 2 illustrates a block diagram of one embodiment of a central processing unit.

FIG. 2 illustrates one embodiment of CPU 102 coupled to power converter 210. In one embodiment, power converter 210 is a programmable DC-to-DC (switch-mode) power converter located near the CPU 102 IC package to provide high power to CPU 102. However in other embodiments, power converter 210 may be located on the CPU 102 package.

Figure 3:
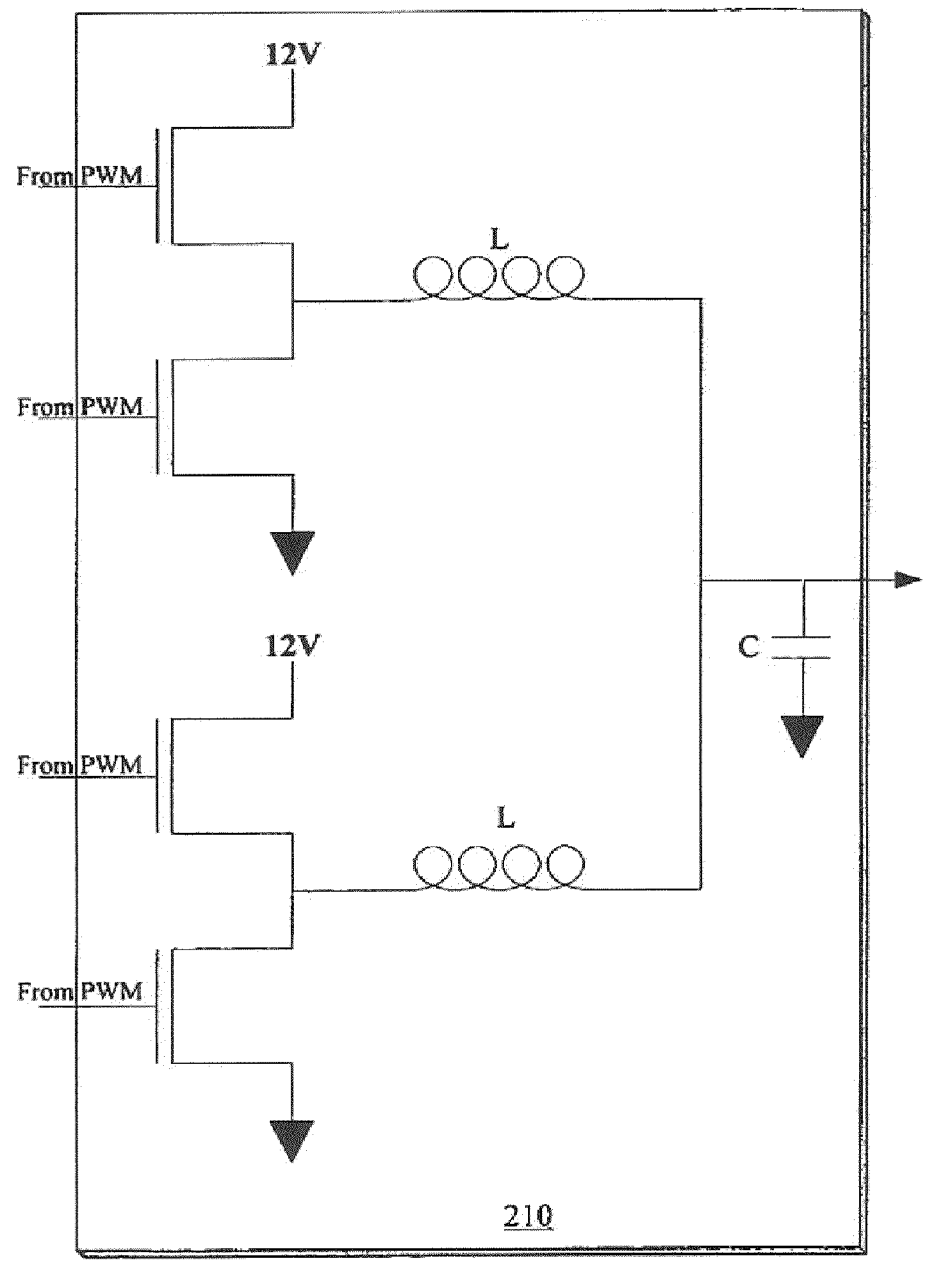
FIG. 3 illustrates one embodiment of a power converter.

FIG. 3 illustrates one embodiment of power converter 210. Power converter 210 is a 2-phase converter that receives a 12V voltage input at each phase, which is converted to a 1.2V output voltage. According to one embodiment, each phase includes a set of power field effect transistors (FETs) and an inductor. The phases all couple into a shared bank of output filter capacitors, represented in FIG. 3 as a single capacitor C.

Referring back to FIG. 2, CPU 102 includes processing cores 0-3 coupled to receive power from power converter 210, and a power control unit 250. Each processing core operates as an independent microprocessor to permit thread-level parallelism. Power control unit 250 regulates the voltage applied to CPU 102 by power converter 210, based at least in part on the potential of the operational frequency of all or a subset of the operational circuit(s) of CPU 102.

Figure 4:
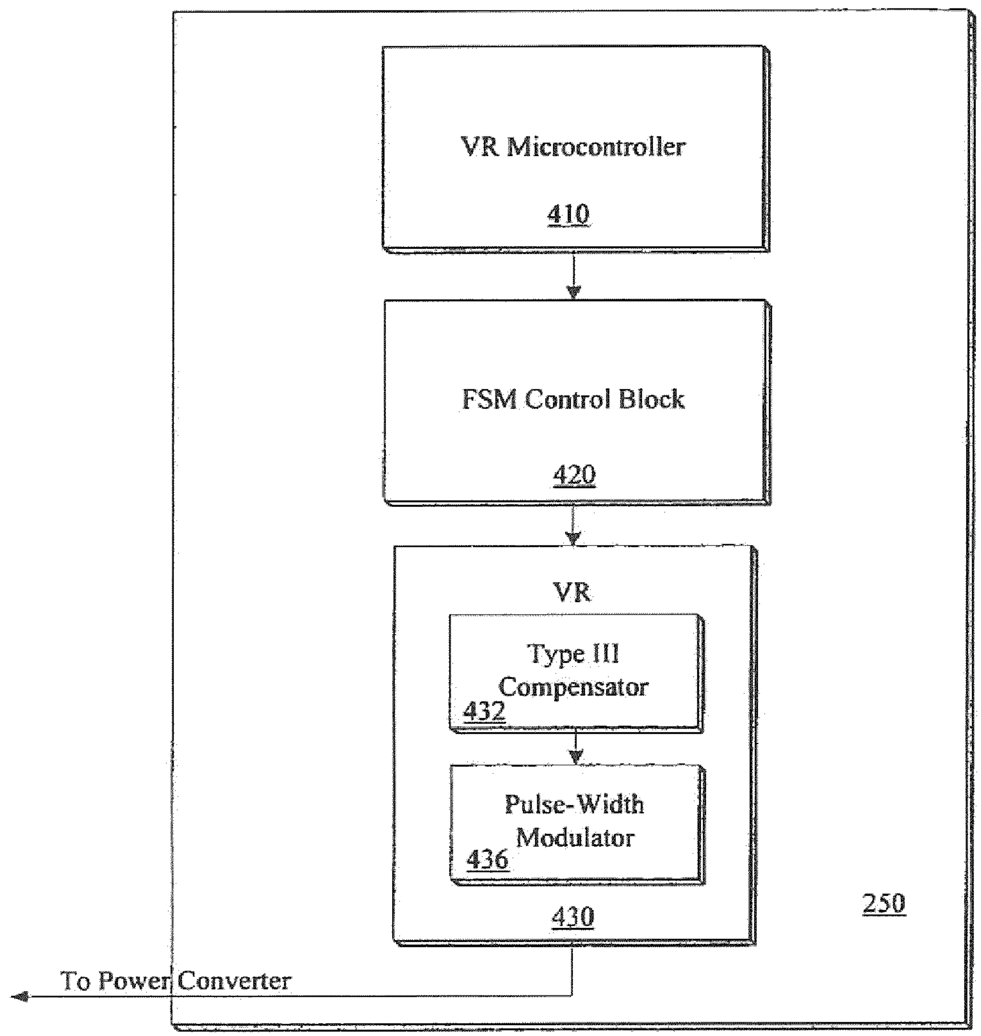
FIG. 4 illustrates a block diagram of one embodiment of a power control unit.

FIG. 4 illustrates one embodiment of power control unit 250. Power control unit 250 includes a voltage regulator (VR) microcontroller 410, a finite state machine (FSM) control block 420 and a VR 430. VR microcontroller 410 provides voltage control configuration parameters that are implemented to control voltage. According to one embodiment, VR microcontroller 410 provides the configuration parameters via input/output (I/O) writes to addresses to add coefficients that define voltage control functionality.

FSM control block 420 implements various FSMs to control various voltage control parameters. In one embodiment, FSM control block 420 includes ramp rate control, power throttle and loadline adjust current. VR 430 includes a compensator 432 and a pulsewidth modulator 436. Compensator 432 receives a target voltage from control block and compares the target voltage to an actual voltage received from one or more of the cores 0-3.

In response, compensator 432 generates an error term that is used to drive to zero error using negative feedback. Pulse-width modulator 436 generates pulse signals to control current based upon the error term received from compensator 432. The pulse signals are transmitted from pulsewidth modulator 436 to power converter 210 to control the activation of the power FETs at each phase.

In normal operation, CPU 102 components may demand a very high current from power converter 210, which is generally the motivation for designing a voltage regulator with multiple phases. In normal operation, the current demand is generally high enough that multiple phases can continuously be pulsed, and the energy lost in continuous pulsing is small compared to the total current draw.

However at certain instances (e.g., where CPU 102 goes into a sleep state), it would be inefficient for power converter 210 to continuously pulse even a single phase. According to one embodiment, whenever the CPU 102 cores go into a sleep state, power control unit 250 and power converter 210 go into a suspend mode. In such an embodiment, a clock supplying power control unit 250 is deactivated.

In such an embodiment, the current draw at CPU 102 is sufficiently low so as to enable the charge stored at the output filter capacitors to supply power to CPU for a predetermined period of time. For example, if the CPU 102 sleep state duration is in a range of a few (e.g., 2-4) milliseconds operation at power control unit 250 and power converter 210 may be suspended until CPU 102 is reactivated. Thus, the power FET switches at power converter 210 are deactivated (e.g., no current generated by power converter 210) until CPU 102 is reactivated.

In another embodiment, power control unit 250 monitors the CPU 102 voltage whenever it and power converter 210 are in the suspend state. In this embodiment, power converter 210 remains in the suspend state until the voltage falls below a predetermined threshold (e.g., 1.2V). Once the voltage falls below the threshold, VR 430 exits the suspend state and transmits a pulse to activate one or both of the phases at power converter 210 in order to supply current to CPU 102. In a further embodiment, VR 430 may reenter the suspend state once current is supplied to CPU 102 as long as CPU 102 remains in the sleep state. Subsequently, the CPU 102 is again monitored by power control unit 250.

In yet another embodiment, whenever CPU 102 is in the suspend state and the CPU 102 voltage is above the threshold voltage, power converter 210 will enter an adaptive diode emulation mode. In such a mode, one phase is repeatedly sequenced through the following states: only upper FET on (UPPER state), only lower FET on (LOWER state), both FETs off (OFF state). Further, the repeated sequencing is performed at a largely fixed frequency, and the portion of time spent in each state is adapted to maintain a desired voltage. In another embodiment, the UPPER state time and the LOWER state time may be largely fixed, while the OFF state time is adapted to maintain a desired voltage.

The above-described power management mechanism yields an increase in battery life in a mobile computer system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system, comprising:

a programmable power control system to control a switch-based regulator during each of multiple states of a processor system, including to operate the switch-based regulator in accordance with a first mode to provide power to the processor system when the processor is in a wake state, and in accordance with a second mode when the processor is in a reduced power-consumption state, wherein the programmable power control system includes a voltage regulator controller to provide voltage control configuration parameters, and a finite state machine (FSM) control system to implement one or more finite state machines (FSMs) to control one or more voltage regulation control parameters, including one or more of a ramp rate control parameter, a power throttle control parameter, and a load-line adjust current parameter, based on the voltage control configuration parameters, and to determine a target voltage, wherein the system is implemented to deactivate an input clock of the power control system when the processor system transitions to a sleep state to place the power control system in the second mode in which operation of at least a portion the power control system and operation of the switch-based regulator is suspended, the power control system is implemented to exit the second mode when a voltage of the processor system is below a threshold and operate the switch-based regulator to increase the processor system voltage, and the power control system is further implemented to return to the second mode when the processor system voltage meets the threshold and the processor system is in the reduced power-consumption state.

2. The system of claim 1, wherein the programmable power control system further includes:

a voltage regulator, including, a compensator to generate an error term to reduce a difference between the target voltage and the processor system voltage, and a pulse-width modulator to generate pulse signals to operate the switch-based regulator based on the error term.

3. The system of claim 1, wherein:

the switch-based regulator includes multiple switch-based circuits, each to contribute to a voltage of the processor system;

the power control system is controllable to operate in the second mode when the processor system is in the reduced power-consumption state and a voltage of the processor system is above the threshold;

the power control system is implemented to cycle one of the multiple switch-based circuits through a sequence of switch configuration states to maintain a target voltage, when in the second mode; and the switch configuration states include, a first state in which a first switch device is closed and a second switch device is open, a second state in which the first switch device is open and the second switch device is closed, and a third state in which the first and second switch devices are open.

4. The system of claim 3, wherein the power control system is further implemented to:

repeat the cycle at a substantially fixed cycle-repetition frequency, when in the second mode; and adapt durations of the first, second, and third switch configuration states to maintain the target voltage, when in the second mode.

5. The system of claim 3, wherein the power control system is further implemented to:

maintain durations of the first and second switch configuration states substantially fixed, when in the second mode; and adapt a duration of the third switch configuration state to maintain the target voltage, when in the second mode.

6. A method, comprising:

controlling a switch-based regulator with a programmable power control system during each of multiple states of a processor system that receives power from the switch-based regulator, wherein the controlling includes, operating in accordance with a first mode to provide power to the processor system when the processor system is in a wake state, and operating in accordance with a second mode when the processor system is in a reduced power-consumption state, wherein said controlling further includes providing voltage control configuration parameters with a voltage regulator controller, implementing one or more finite state machines (FSMs) to control one or more voltage regulation control parameters, including one or more of a ramp rate control parameter, a power throttle control parameter, and a load-line adjust current parameter, based on the voltage control configuration parameters, under control of a FSM control system, deactivating an input clock of the power control system when the processor system transitions to a sleep state to place the power control system in the second mode in which operation of at least a portion the power control system and operation of the switch-based regulator is suspended, exiting the second mode when the processor system voltage is below a threshold to operate the switch-based regulator to increase the processor system voltage, and returning to the second mode when the processor system voltage meets the threshold and the processor system is in the reduced power-consumption state.

7. The method of claim 6, wherein the controlling further includes:

determining a target voltage under control of the FSM control system;

generating an error term based on the comparison to reduce a difference between the target voltage and the processor system voltage; and generating pulse signals to operate the switch-based regulator based on the error term.

8. The method of claim 6, wherein:

the switch-based regulator includes multiple switch-based circuits, each to contribute to a voltage of the processor system;

the controlling further includes operating in the second mode when the processor system is in the reduced power-consumption state and a voltage of the processor system is above the threshold;

the operating in accordance with the second mode includes cycling one of the multiple switch-based circuits through a sequence of switch configuration states to maintain a target voltage; and the switch configuration states include, a first state in which a first switch device is closed and a second switch device is open, a second state in which the first switch device is open and the second switch device is closed, and a third state in which the first and second switch devices are open.

9. The method of claim 8, wherein the operating in accordance with the second mode further includes:

repeating the cycling of the one of multiple switch-based circuit at a substantially fixed cycle-repetition frequency; and adapting durations of the first, second, and third switch configuration states to maintain the target voltage.

10. The method of claim 8, wherein the operating in accordance with the second mode further includes:

maintaining durations of the first and second switch configuration states substantially fixed; and adapting a duration of the third switch configuration state to reduce the difference between the processor system voltage and the target voltage.

11. A system, comprising:

a battery;

a processor system;

a switch-based regulator to provide power to the processor system from the battery; and a programmable power control system to control the switch-based regulator during each of multiple states of the processor system, including to operate the switch-based regulator in accordance with a first mode to provide power to the processor system when the processor is in a wake state, and in accordance with a second mode when the processor is in a reduced power-consumption state, wherein the programmable power control system includes a voltage regulator controller to provide voltage control configuration parameters, and a finite state machine (FSM) control system to implement one or more finite state machines (FSMs) to control one or more voltage regulation control parameters, including one or more of a ramp rate control parameter, a power throttle control parameter, and a load-line adjust current parameter, based on the voltage control configuration parameters, and to determine a target voltage, wherein the system is implemented to deactivate an input clock of the power control system when the processor system transitions to a sleep state to place the power control system in the second mode in which operation of at least a portion the power control system and operation of the switch-based regulator is suspended, the power control system is implemented to exit the second mode when a voltage of the processor system is below a threshold and operate the switch-based regulator to increase the processor system voltage, and the power control system is further implemented to return to the second mode when the processor system voltage meets the threshold and the processor system is in the reduced power-consumption state.

12. The system of claim 11, wherein the power control system includes:

a voltage regulator, including, a compensator to generate an error term to reduce a difference between the target voltage and the processor system voltage, and a pulse-width modulator (PWM) to generate pulse signals to operate the switch-based regulator based on the error term.

13. The system of claim 11, wherein:

the switch-based regulator includes multiple switch-based circuits, each to contribute to a voltage of the processor system;

the power control system is controllable to operate in the second mode when the processor system is in the reduced power-consumption state and a voltage of the processor system is above the threshold;

the power control system is implemented to cycle one of the multiple switch-based circuits through a sequence of switch configuration states to maintain a target voltage, when in the second mode; and the switch configuration states include, a first state in which a first switch device is closed and a second switch device is open, a second state in which the first switch device is open and the second switch device is closed, and a third state in which the first and second switch devices are open.

14. The system of claim 13, wherein the power control system is further implemented to:

repeat the cycle at a substantially fixed cycle-repetition frequency, when in the second mode; and adapt durations of the first, second, and third switch configuration states to maintain the target voltage, when in the second mode.

15. The system of claim 13, wherein the power control system is further implemented to:

maintain durations of the first and second switch configuration states substantially fixed, when in the second mode; and adapt a duration of the third switch configuration state to maintain the target voltage, when in the second mode.

* * * * *